United States Patent [19]
Parak et al.

[11] 4,406,697
[45] Sep. 27, 1983

[54] RADIOACTIVE $^{57}$CO SOURCE

[75] Inventors: Fritz Parak, No. 65, Hermann Stockmann Strasse, 8060 Dachau; Jörg Loock, No. 2, Fafnerstrasse, 8000 München 19, both of Fed. Rep. of Germany; Runar Kouzmine, Garching, Fed. Rep. of Germany

[73] Assignees: Fritz Parak; Jörg Loock, both of München, Fed. Rep. of Germany

[21] Appl. No.: 227,009

[22] Filed: Jan. 21, 1981

Related U.S. Application Data

[63] Continuation-in-part of Ser. No. 945, Jan. 4, 1979, abandoned.

[30] Foreign Application Priority Data

May 12, 1978 [DE] Fed. Rep. of Germany ....... 2820754

[51] Int. Cl.$^3$ ............................................. C22C 43/00
[52] U.S. Cl. .................................. 75/122.5; 252/644
[58] Field of Search ...................... 75/112.5, 135, 149; 252/636, 644, 645

[56] References Cited

U.S. PATENT DOCUMENTS 3,549,354 12/1970 Wheeler .............................. 75/122.5

FOREIGN PATENT DOCUMENTS 2820754 11/1979 Fed. Rep. of Germany ...... 252/644

*Primary Examiner*—Leland A. Sebastian
*Attorney, Agent, or Firm*—John C. Smith, Jr.

[57] ABSTRACT

A radioactive $^{57}$Co source consists of the intermetallic composition CoSb$_3$ which emits an energetically non-disintegrated 14.4 KeV line. This composition is strictly stoichiometrical and may be dissolved in excess Sb. The atom percent proportion of $^{57}$Co may be up to 25%.

5 Claims, 1 Drawing Figure

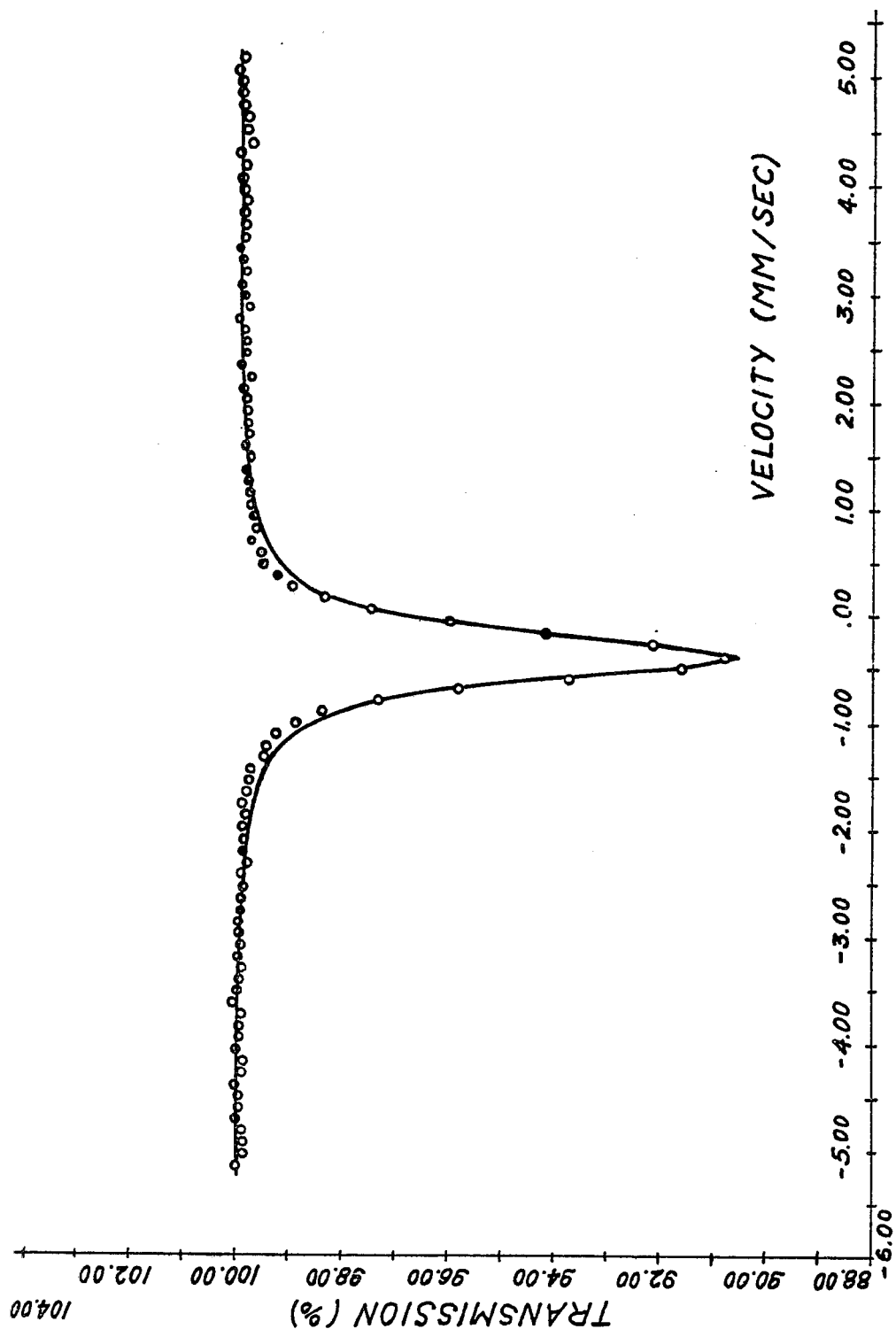

RADIOACTIVE $^{57}$CO SOURCE

This is a continuation-in-part of copending application Ser. No. 945 filed Jan. 4, 1979 now abandoned.

BACKGROUND OF THE INVENTION

A $^{57}$CoSb$_3$ gamma source for Mösbauer spectroscopy with the isotope $^{57}$Fe is described, which source is characterized in that 14.4 KeV gamma radiation of very high intensity per source surface is emitted. A major advantage of the $^{57}$CoSb$_3$ gamma source is that the emitted radiation possesses a well defined energy and does not contain several energetically very similar components resulting from hyperfine interdependencies.

For the examination of substances containing $^{57}$Fe in the technical, chemical and biochemical area, Mösbauer spectroscopy is extensively used. In order to obtain the nuclear resonance absorption or nuclear resonance scatter material for this method, the samples to be tested must be irradiated with gamma radiation which results upon transition of the 14.4 KeV nuclear level of $^{57}$Fe into the basic condition. The 14.4 KeV level occurs as a result of decay of $^{57}$Co into $^{57}$Fe. Mösbauer spectroscopy with samples containing iron therefore must rely on $^{57}$Co sources. In order to provide accurate test results, it is essential that the 14.4 KeV transition of iron is not disintegrated as the result of hyperfine interdependency with the electron envelope. If the gamma radiation contains two or more energetically very similar components, the test results will be unreliable.

Emission of several lines in commercially available sources is presently avoided by diffusing the isotope $^{57}$Co into a metal matrix. The metal used as matrix must have a cubic crystal structure and must be non-magnetic. Suitable commercially available matrix metals include V2A, Cu, Pt, Pd and Rh. The highest intensity per source surface is obtained with Rh as the matrix. In this case up to a maximum of 6 atom percent $^{57}$Co may be diffused without a hyperfine dissintegration occurring. Upon further increasing the $^{57}$Co content, a magnetic coupling results and the emission spectrum comprises several lines making the source unusable for most applications. As a result of the relatively low $^{57}$Co content, the maximum effective intensity of the source, considering the self-absorption in the matrix material, is limited to less than 50 mCi/mm$^2$.

In addition to the use of matrix sources, attempts have been made to use $^{57}$CoO in Mösbauer spectroscopy. In this cubic composition, $^{57}$Co is in the bivalent oxidation phase. Such one-line sources are described in literature by Mullen and Ode. Difficulties with these sources are the non-reproducibility of a strictly stoichiometric $^{57}$CoO composition. Even minute deviations from stoichiometry result in an Fe$^{3+}$ emission line occurring in addition to the desired Fe$^{2+}$ line thus rendering the source unusable.

Also, prior to the present invention it has not been possible to produce sources without the addition of inactive Co which causes the per se minor self-absorption of CoO sources to be greatly increased.

In accordance with the present invention, $^{57}$Co Mösbauer one-line sources may be produced with an effectively usable overall intensity of up to 200 mCi/mm$^2$. The overall intensity available per area is four times that of the matrix sources. The atom percent proportion of $^{57}$Co in the $^{57}$CoSb$_3$ composition may be up to 25% and the presence of excess $^{57}$Co, which forms undesired and interfering $^{57}$CoSb$_2$ compositions, is avoided. The sources of the present invention may be reproduced with a minimum of technical equipment. Highly active sources with an area of only 1 mm$^2$ may be produced in accordance with the present invention. The regeneration required for all highly active sources, in which the resulting $^{57}$Fe must be removed, is extremely simple compared with the prior art matrix sources.

BRIEF DESCRIPTION OF THE DRAWING

The single FIGURE illustrates a Mösbauer test spectrum of one of the described sources.

DESCRIPTION OF THE PREFERRED EMBODIMENT

In the FIGURE the circles indicate the experimental values of the $^{57}$CoSb$_3$ composition of the present invention. K$_4$Fe(CN)$_6$ was used as absorber. The required one line with the theoretically called-for Lorentz distribution is obtained (cf. full-line curve).

The $^{57}$CoSb$_3$ composition may be produced by the following process: A $^{57}$CoCl$_2$ solution may be introduced in a small vessel made of Sb and then dried. The $^{57}$CoCl$_2$ is then reduced in a stream of hydrogen at about 300° C. to form $^{57}$Co metal. The Sb vessel then is melted at about 770° C. resulting in the formation of an alloy containing the composition $^{57}$CoSb$_3$ which can be used as a Mösbauer source without further processing. However, the alloy contains, besides the $^{57}$CoSb$_3$ composition, additional Sb which reduces the useful intensity of the source due to absorption. It is possible to remove this excess Sb if desired by evaporating the Sb at about 1000° C. for a sufficient time until only the Sb which is bound to $^{57}$Co as $^{57}$CoSb$_3$ remains. This increases the useful intensity of the source.

The $^{57}$CoSb$_3$ composition produced in accordance with the present invention is strictly stoichiometrical, and the atom percent of $^{57}$Co in the composition is no higher than 25%, the presence of excess $^{57}$Co being avoided. The advantage of the composition, $^{57}$CoSb$_3$, is that it has a very advantageous phase diagram so that the stoichiometrical composition is achieved even in the presence of an excess of Sb during melting together of $^{57}$Co and Sb. Furthermore, it is possible to produce the composition, $^{57}$CoSb$_3$, in extremely small amounts without difficulty which small amounts are desirable for Mösbauer spectroscopy.

New fields with major significance for research and application are opened to Mösbauer spectroscopy by the new highly intensive $^{57}$Co sources. While the presently used matrix sources, with a few exceptions, can only be used for absorption spectroscopy, the new sources can be used not only for improved absorption spectroscopy but also for measurements in scatter geometry. The improvements in absorption spectroscopy include a reduction in the time required for measurements and also the ability to test smaller samples. This is significant particularly in the field of material testing and biochemistry. In scatter geometry, tests similar to X-ray structure tests may be performed. A source with an area of 1 mm$^2$ is substituted for the X-ray fine structure tube. For example, in the structure determination of proteins, the strong sources permit the clarification of the structure of highly molecular proteins, a determination which is impossible with presently known X-ray methods. Knowledge of the structure of such highly molecular proteins is of particular significance in the medical field. Also, the testing of perfect crystals containing Fe is possible which has particular significance in the development of gamma lasers. In addition, for the first time nuclear resonance small-angle scatter experiments are possible with the improved sources of the present invention.

We claim:

1. A process for preparing a radioactive $^{57}$Co source comprising contacting $^{57}$CoCl$_2$ with Sb, reducing said $^{57}$CoCl$_2$, and melting said Sb to form an alloy containing said composition $^{57}$CoSb$_3$.

2. The process according to claim 1 comprising the further step of heating said composition to a temperature and for a time sufficient to evaporate said Sb to form a composition wherein only the Sb bound to $^{57}$Co as $^{57}$CoSb$_3$ remains.

3. The process according to claim 2 wherein said $^{57}$CoCl$_2$ is reduced in a stream of hydrogen to form the $^{57}$Co metal.

4. The process according to claim 3 wherein said $^{57}$CoCl$_2$ is reduced in a stream of hydrogen at about 300° C.

5. The process according to claim 1 wherein said Sb is melted at about 770° C.

* * * * *